(12) United States Patent
Oda

(10) Patent No.: US 12,468,109 B2
(45) Date of Patent: Nov. 11, 2025

(54) OPTICAL INPUT/OUTPUT DEVICE

(71) Applicant: Fujikura Ltd., Tokyo (JP)

(72) Inventor: Takuya Oda, Sakura (JP)

(73) Assignee: Fujikura Ltd., Tokyo (JP)

( * ) Notice: Subject to any disclaimer, the term of this patent is extended or adjusted under 35 U.S.C. 154(b) by 169 days.

(21) Appl. No.: 18/245,720

(22) PCT Filed: Feb. 18, 2022

(86) PCT No.: PCT/JP2022/006647
§ 371 (c)(1),
(2) Date: Mar. 17, 2023

(87) PCT Pub. No.: WO2022/176978
PCT Pub. Date: Aug. 25, 2022

(65) Prior Publication Data
US 2023/0358961 A1    Nov. 9, 2023

(30) Foreign Application Priority Data

Feb. 19, 2021    (JP) .................................. 2021-025601

(51) Int. Cl.
*G02B 6/44*    (2006.01)
*G02B 6/26*    (2006.01)
*G02B 6/38*    (2006.01)

(52) U.S. Cl.
CPC ......... *G02B 6/44715* (2023.05); *G02B 6/264* (2013.01); *G02B 6/3885* (2013.01)

(58) Field of Classification Search
None
See application file for complete search history.

(56) References Cited

U.S. PATENT DOCUMENTS

| 8,725,001 B2 | 5/2014 | Fini et al. |
| 2010/0195965 A1 | 8/2010 | Sasaoka |

(Continued)

FOREIGN PATENT DOCUMENTS

| JP | 2012516470 A | 7/2012 |
| JP | 2012-530936 A | 12/2012 |

(Continued)

OTHER PUBLICATIONS

International Search Report issued in corresponding International Application No. PCT/JP2022/006647 dated Apr. 12, 2022 (5 pages).

*Primary Examiner* — Jerry Rahll
(74) *Attorney, Agent, or Firm* — Osha Bergman Watanabe & Burton

(57) ABSTRACT

An optical input/output device includes: one or more multicore fibers each comprising one or more transmitting cores and one or more receiving cores; first transmitting single-core fibers whose number is equal to a total number of the transmitting cores; first receiving single-core fibers whose number is equal to a total number of the receiving cores in all the multicore fibers; a fan-in/fan-out device that optically couples each core of the first transmitting single-core fibers and each of the transmitting cores at one end of a respective one of the first transmitting single-core fibers, and optically couples each of the first receiving single-core fibers and each of the receiving cores at one end of a respective one of the first receiving single-core fibers; and a transmission/reception connector comprising connector ports whose number is equal to a total number of the first transmitting single-core fibers and the first receiving single-core fibers.

11 Claims, 3 Drawing Sheets

(56) References Cited

U.S. PATENT DOCUMENTS

| | | |
|---|---|---|
| 2011/0052122 A1 | 3/2011 | Brucher et al. |
| 2013/0129292 A1 | 5/2013 | Sasaoka et al. |
| 2014/0205244 A1* | 7/2014 | Bradley ............. G02B 6/02042 |
| | | 385/78 |
| 2015/0063755 A1 | 3/2015 | Doany et al. |
| 2015/0078744 A1 | 3/2015 | Ito et al. |
| 2015/0326316 A1 | 11/2015 | Watanabe et al. |
| 2018/0337726 A1* | 11/2018 | Oda ..................... H04B 10/077 |
| 2018/0341060 A1 | 11/2018 | Oda et al. |
| 2024/0061186 A1* | 2/2024 | Wu ....................... G02B 6/3873 |
| 2024/0329328 A1* | 10/2024 | Butler .................. G02B 6/3831 |

FOREIGN PATENT DOCUMENTS

| | | |
|---|---|---|
| JP | 2013-106135 A | 5/2013 |
| JP | 2015-216615 A | 12/2015 |
| JP | 2019-152804 A | 9/2019 |
| WO | 2013/157245 A1 | 10/2013 |
| WO | 2017/090622 A1 | 6/2017 |
| WO | 2020/257660 A1 | 12/2020 |

* cited by examiner

OPTICAL INPUT/OUTPUT DEVICE

TECHNICAL FIELD

The present invention relates to an optical input/output device.

BACKGROUND

A multicore fiber in which a plurality of cores are arranged in a cladding is known, and a device for making light enter the multicore fiber or emitting light from the multicore fiber is known. Patent Literature 1 below describes an optical connector as an example of the device. In the optical connector, each core of the multicore fiber and each core of a plurality of single-core fibers are optically connected via each waveguide formed in a waveguide substrate.

[Patent Literature 1] JP 2019-152804 A

Meanwhile, in the multicore fiber, crosstalk is likely to occur because a core pitch is small. Therefore, it is desirable that an optical signal with reduced crosstalk that affects communication is propagated.

SUMMARY

In this regard, one or more embodiments of the present invention provide an optical input/output device capable of reducing crosstalk that affects communication.

An optical input/output device according to one or more embodiments of the present invention includes: at least one multicore fiber that include at least one transmitting core and at least one receiving core; first transmitting single-core fibers whose number is equal to the total number of transmitting cores of all the multicore fibers; first receiving single-core fibers whose number is equal to the total number of receiving cores of all the multicore fibers; a fan-in/fan-out device that optically couples each core at one end of each of the first transmitting single-core fibers and each of the transmitting cores, and optically couples each core at one end of each of the first receiving single-core fibers and each of the receiving cores; and a transmission/reception connector that includes connector ports whose number is equal to a total number of first transmitting single-core fibers and first receiving single-core fibers, the connector ports being connected to the other ends of the respective first transmitting single-core fibers and configured to optically couple the cores of the respective first transmitting single-core fibers and transmission ports of a transceiver and being connected to the other ends of the respective first receiving single-core fibers and configured to optically couple the cores of the respective first receiving single-core fibers and reception ports of the transceiver.

With such an optical input/output device, in a case where the core of each of the transmitting single-core fibers is optically connected to the transmission port of the transceiver, an optical signal transmitted from the transmission port of the transceiver propagates to the transmitting core in the multicore fiber via the transmitting single-core fiber, and in a case where the core of each of the receiving single-core fibers is optically connected to the reception port of the transceiver, an optical signal received by the reception port of the transceiver via the receiving single-core fiber propagates to the receiving core. Therefore, a direction in which light propagates to the transmitting core and a direction in which light propagates to the receiving core in the multicore fiber are opposite to each other. Therefore, even when crosstalk occurs between the transmitting core and the receiving core, in a case of light crosstalk from the transmitting core to the receiving core, the light is suppressed from being received by the transceiver, and in a case of light crosstalk from the receiving core to the transmitting core, the light is suppressed from propagating to the transceiver as a transmission destination. Therefore, with the optical input/output device of the present invention, crosstalk that affects communication can be reduced.

At least one of core pairs adjacent to each other at a shortest distance in at least one of the multicore fibers may be a transmitting/receiving core pair including the transmitting core and the receiving core.

The crosstalk tends to increase as the core pitch decreases. Therefore, since the core pair adjacent to each other at the shortest distance is the transmitting/receiving core pair, it is possible to reduce crosstalk that affects communication as compared with a case where all the core pairs adjacent to each other at the shortest distance are the core pairs of the transmitting cores or the core pairs of the receiving cores.

In this case, in at least one of the multicore fibers, all the core pairs adjacent to each other at a shortest distance may be the transmitting/receiving core pairs.

In this way, crosstalk that affects communication can be further reduced.

In addition, in the optical input/output device according to any one of the above, the number of multicore fibers may be plural, the cores of the respective first transmitting single-core fibers connected to a pair of connector ports adjacent to each other may be optically coupled to the transmitting cores of different multicore fibers, respectively, and the cores of the respective first receiving single-core fibers connected to a pair of connector ports adjacent to each other may be optically coupled to the receiving cores of different multicore fibers, respectively.

The first transmitting optical fibers connected to a pair of transmission connector ports adjacent to each other tend to be optically coupled to the pair of transmission ports adjacent to each other in the transceiver, and the first receiving optical fibers connected to a pair of reception connector ports adjacent to each other tend to be optically coupled to the pair of reception ports adjacent to each other in the transceiver. Meanwhile, in the transceiver, in general, crosstalk is likely to occur between lights emitted from the transmission ports adjacent to each other or between electrical signals of these lights, and crosstalk is likely to occur between lights emitted from the reception ports adjacent to each other or between electrical signals obtained by converting these lights. However, even in a case where such crosstalk occurs, the cores of a pair of first transmitting single-core fibers that propagate light in which crosstalk has occurred in the transceiver are coupled to the transmitting cores of different multicore fibers, and the cores of a pair of first receiving single-core fibers that propagate light in which crosstalk has occurred in the transceiver are coupled to the receiving cores of different multicore fibers. Therefore, crosstalk in the multicore fiber between the optical signals propagating through the cores of the pair of first transmitting single-core fibers in which crosstalk has occurred is suppressed, and crosstalk in the multicore fiber between the optical signals propagating through the cores of the pair of first receiving single-core fibers in which crosstalk has occurred is suppressed. Therefore, it is possible to reduce crosstalk that affects communication as compared with a case where a pair of first single-core optical fibers connected to a pair of connector ports adjacent to each other is coupled to the transmitting cores of the same multicore fiber or a case where a pair of first single-core optical fibers connected to a pair of connector ports adjacent to each other is coupled to the receiving cores of the same multicore fiber.

Alternatively, the cores of the respective first transmitting single-core fibers connected to a pair of connector ports adjacent to each other may be optically coupled to a pair of transmitting cores other than the core pair adjacent to each other at a shortest distance in one multicore fiber, respectively, and the cores of the respective first receiving single-core fibers connected to a pair of connector ports adjacent to each other may be optically coupled to a pair of receiving cores other than the core pair adjacent to each other at a shortest distance in one multicore fiber, respectively.

Even in a case where crosstalk occurs in the transceiver as described above, the cores of the pair of first transmitting single-core fibers are coupled to a pair of transmitting cores that are not adjacent to each other at the shortest distance in the multicore fiber, and the cores of the pair of first receiving single-core fibers are coupled to a pair of receiving cores that are not adjacent to each other at the shortest distance in the multicore fiber. Therefore, the crosstalk in the multicore fiber can be suppressed as compared with a case where the cores of the pair of first transmitting single-core fibers in which the crosstalk has occurred are coupled to the pair of transmitting cores adjacent to each other at the shortest distance in the multicore fiber, or the cores of the pair of first receiving single-core fibers in which the crosstalk has occurred are coupled to the pair of receiving cores adjacent to each other at the shortest distance in the multicore fiber.

In this case, the receiving core may be positioned between a pair of transmitting cores of the multicore fiber to which the cores of the respective first transmitting single-core fibers connected to a pair of connector ports adjacent to each other are optically coupled, and the transmitting core may be positioned between a pair of receiving cores of the multicore fiber to which the cores of the respective first receiving single-core fibers connected to a pair of connector ports adjacent to each other are optically coupled.

As compared with a case where the receiving core is not positioned between the pair of transmitting cores or a case where the transmitting core is not positioned between the pair of receiving cores, it is possible to suppress crosstalk that affects communication.

In the optical input/output device according to any one of the above, the number of multicore fibers, in which a central core arranged at a center of a cladding is the transmitting core or the receiving core, and at least one transmitting core and at least one receiving core are arranged around the central core, may be plural, the transmission/reception connector may include a plurality of partial connectors including two or more connector ports among all the connector ports, each first transmitting single-core fiber or first receiving single-core fiber optically coupled to the central core of each of the multicore fibers may be connected to the connector port of a specific partial connector, and each of the first transmitting single-core fibers connected to each of the transmitting cores arranged around the central core of each of the multicore fibers and each of the first receiving single-core fibers connected to each of the receiving cores arranged around the central core of each of the multicore fibers may be connected to the connector ports of the partial connector other than the specific partial connector.

Light propagating through the central core arranged at the center of the cladding is affected by crosstalk from each of the surrounding cores arranged therearound. Therefore, in a case where the single-core fiber including the core optically coupled to the central core is connected to the specific partial connector as described above to optically connect the specific partial connector and the transceiver, light largely affected by crosstalk is collected from the specific partial connector to one transceiver, and connection is easily made. Therefore, it is possible to easily perform appropriate processing for crosstalk by the transceiver.

In addition, all the multicore fibers may be longer than each of the first transmitting single-core fibers and each of the first receiving single-core fibers.

In optical communication, skew may cause a difference in transmission time of light propagating through each core. In the multicore fiber, since a difference hardly occurs in the length between the arranged cores, the skew hardly occurs. On the other hand, among the plurality of single-core fibers, a difference is likely to occur in the length between the respective cores, and the skew is likely to occur. Therefore, since all the multicore fibers are longer than each of the first transmitting single-core fibers and each of the first receiving single-core fibers as described above, the proportion of the transmission path of the single-core fibers can be reduced. Therefore, it is possible to suppress skew as compared with a case where all the multicore fibers are shorter than each of the first transmitting single-core fibers and each of the first receiving single-core fibers.

The optical input/output device according to any one of the above further includes: a housing that accommodates at least parts of each of the first transmitting single-core fibers and each of the first receiving single-core fibers; second transmitting single-core fibers whose number is equal to the number of first transmitting single-core fibers, the second transmitting single-core fibers each including a core that is configured to be optically coupled to the core at the other end of each of the first transmitting single-core fibers and be optically coupled to the transmission port of the transceiver, and being at least partially arranged outside the housing; and second receiving single-core fibers whose number is equal to the number of first receiving single-core fibers, the second receiving single-core fibers each including a core that is configured to be optically coupled to the core at the other end of each of the first receiving single-core fibers and be optically coupled to the reception port of the transceiver, and being at least partially arranged outside the housing. Then, a plurality of single-core fiber pairs including a plurality of first single-core fibers including each of the first transmitting single-core fibers and each of the first receiving single-core fibers, and a plurality of second single-core fibers including each of the second transmitting single-core fibers and each of the second receiving single-core fibers and optically coupled to the respective first single-core fibers are assumed. In this case, in at least one of the plurality of single-core fiber pairs, the optical confinement power of the first single-core fiber may be greater than the optical confinement power of the second single-core fiber, and the outer diameter of the cladding of the second single-core fiber may be larger than the outer diameter of the cladding of the first single-core fiber. Alternatively, in this case, the first single-core fiber may include the core, a cladding surrounding the core and having a refractive index lower than that of the core, and a trench layer surrounding the core, surrounded by the cladding, and having a refractive index lower than that of the cladding, the second single-core fiber includes the core and a cladding surrounding the core and having a refractive index lower than that of the core, and does not include a trench layer surrounding the core, surrounded by the cladding, and having a refractive index lower than that of the cladding, and the outer diameter of the cladding of the second single-core fiber is larger than the outer diameter of the cladding of the first single-core fiber.

In this case, each single-core fiber pair includes the first transmitting single-core fiber and the second transmitting single-core fiber, or includes the first receiving single-core fiber and the second receiving single-core fiber. Since the first transmitting single-core fiber and the first receiving single-core fiber are arranged in a limited space in the housing, the first transmitting single-core fiber and the first receiving single-core fiber arranged in the housing tend to be bent with a larger curvature than the second transmitting single-core fiber and the second receiving single-core fiber arranged outside the housing. Therefore, the optical confinement power of the first single-core fiber assumed as described above is greater than the optical confinement power of the second single-core fiber optically coupled to the first single-core fiber, a bending loss of light in the first single-core fiber can thus be suppressed. In a case where the optical confinement power of the second single-core fiber is smaller than the optical confinement power of the first single-core fiber, a refractive index of the core of the second single-core fiber can be made smaller than a refractive index of the core of the first single-core fiber. In this case, the amount of dopant for increasing the refractive index added to the core of the second single-core fiber can be suppressed, and in the second single-core fiber, a loss due to Rayleigh scattering can thus be further suppressed than in the first single-core fiber. Meanwhile, since the second single-core fiber arranged outside the housing is generally connected to the transceiver arranged at a position away from the input/output device, the second single-core fiber tends to be longer than the first single-core fiber. Therefore, since the loss due to Rayleigh scattering in the second single-core fiber can be further suppressed than in the first single-core fiber, the loss of light can be suppressed in the optical input/output device.

In addition, even in a case where the first single-core fiber includes the trench layer, the bending loss of light in the first single-core fiber can be suppressed. In addition, although the optical fiber including the trench layer can suppress the bending loss as described above, a transmission loss in transmission of light over a long distance tends to be larger than that of the optical fiber that does not include the trench layer. Therefore, as described above, since the second single-core fiber that tends to be longer than the first single-core fiber does not include the trench layer, a transmission loss of light in the second single-core fiber can be suppressed, and a loss of light in the optical input/output device can be suppressed.

In addition, since the outer diameter of the cladding of the first single-core fiber is smaller than the outer diameter of the cladding of the second single-core fiber, a breaking coefficient of the first single-core fiber can be made smaller than a breaking coefficient of the second single-core fiber. Therefore, even in a case where the first single-core fiber is bent at a curvature larger than that of the second single-core fiber, breakage of the first single-core fiber can be suppressed.

The core of each of the first transmitting single-core fibers and the transmission port of the transceiver may be optically coupled, and the core of each of the first receiving single-core fibers and the reception port of the transceiver may be optically coupled.

As described above, according to one or more embodiments of the present invention, an optical input/output device capable of reducing crosstalk that affects communication can be provided.

DETAILED DESCRIPTION

Hereinafter, modes for implementing an optical input/output device according to the present invention will be exemplified with reference to the accompanying drawings. Embodiments exemplified below are intended to facilitate understanding of the present invention and are not intended to limit the present invention. The present invention can be changed and modified from the following embodiments without departing from the gist of the present invention. In addition, in the present specification, dimensions of each member may be exaggerated for easy understanding.

Figure 1:
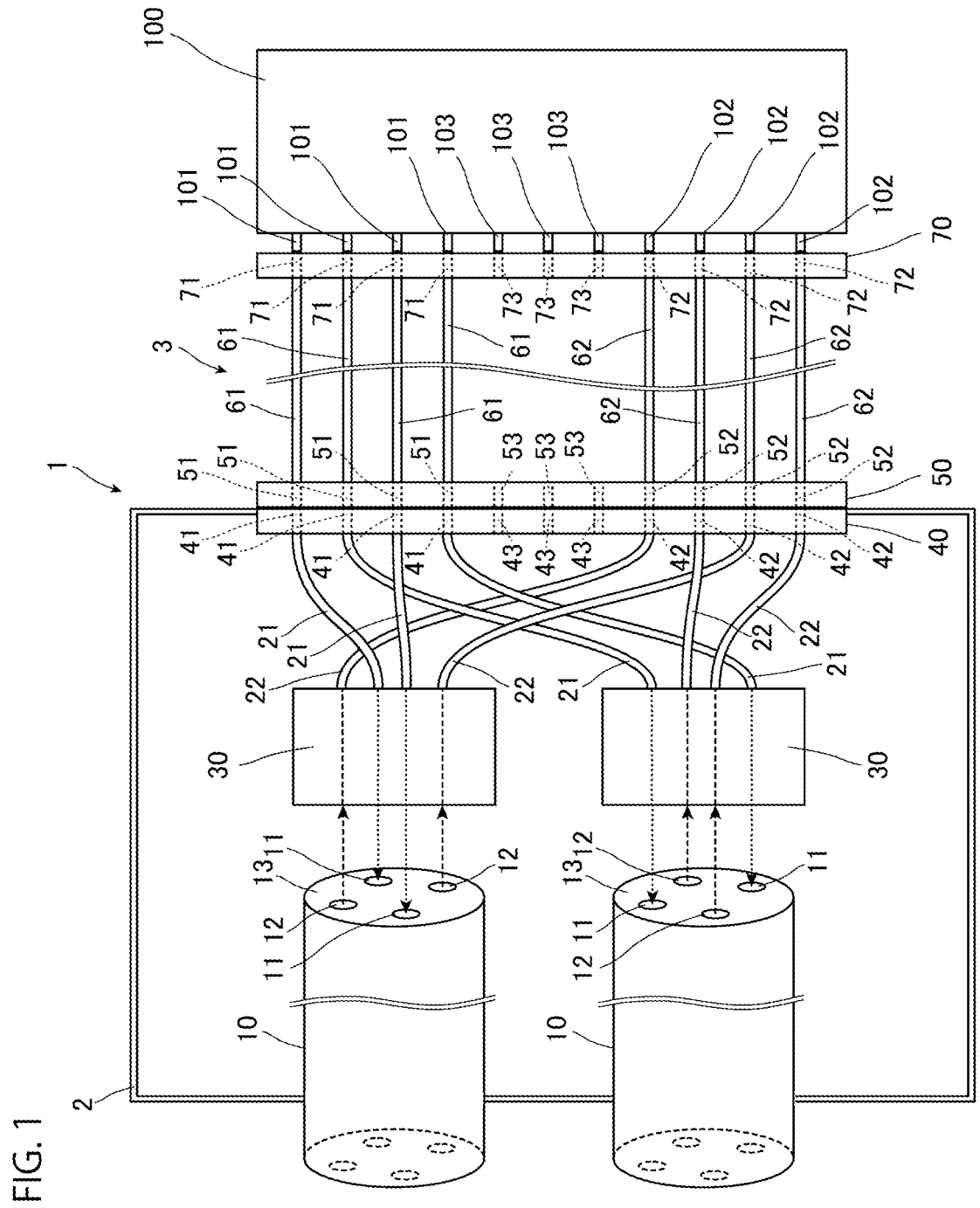
FIG. 1 is a view schematically illustrating an optical input/output device according to one or more embodiments of the present invention.

FIG. 1 is a view schematically illustrating an optical input/output device according to one or more embodiments. As illustrated in FIG. 1, an optical input/output device 1 of one or more embodiments includes, as main components, a multicore fiber 10, a first transmitting optical fiber 21, a first receiving optical fiber 22, a fan-in/fan-out device 30, a transmission/reception connector 40, and a patch cord 3.

The optical input/output device 1 of one or more embodiments is a device that transmits and receives light to and from a transceiver 100 including a plurality of transmission ports 101 and a plurality of reception ports 102. The plurality of transmission ports 101 of the transceiver 100 are arranged in a line and transmit optical signals to the optical input/output device 1. The plurality of reception ports 102 of the transceiver 100 are arranged in a line and receives optical signals output from the optical input/output device 1. According to one or more embodiments, in the transceiver 100, a plurality of unused ports 103 that do not transmit and receive optical signals are linearly arranged at predetermined intervals. The respective transmission ports 101 are arranged on one side of the unused ports 103 at the predetermined intervals on a straight extension line on which the unused ports 103 are arranged. The respective reception ports 102 are arranged on the other side of the unused port 103 at the predetermined intervals on the straight extension line on which the unused ports 103 are arranged.

In one or more embodiments, the optical input/output device 1 includes a plurality of multicore fibers 10. In the example illustrated in FIG. 1, the optical input/output device 1 includes two multicore fibers 10.

Each multicore fiber 10 according to one or more embodiments includes a transmitting core 11 that propagates light from one end side to the other end side, a receiving core 12 that propagates light from the other end side to the one end side, and a cladding 13 that surrounds an outer circumferential surface of each of the transmitting core 11 and the receiving core 12. In this example, each multicore fiber 10 includes a plurality of transmitting cores 11 and a plurality of receiving cores 12. Specifically, as illustrated in FIG. 1, each multicore fiber 10 includes two transmitting cores 11 and two receiving cores 12. Each of the transmitting core 11 and the receiving core 12 propagates light of a wavelength used for communication in a single mode. However, each of the transmitting core 11 and the receiving core 12 may propagate light of a wavelength used for communication in several modes, and in this case, a signal may be superimposed on light of each mode.

In each multicore fiber 10 illustrated in this example, a pair of transmitting cores 11 and a pair of receiving cores 12 are arranged on opposite apexes of a square. Since apexes located on one side and the other side of the square are adjacent apexes at the shortest distance, in each multicore fiber 10 of this example, a core pair adjacent to each other at the shortest distance is a transmitting/receiving core pair including the transmitting core 11 and the receiving core 12.

Each of the first transmitting optical fiber 21 and the first receiving optical fiber 22 is a single-core fiber. Therefore, the first transmitting optical fiber 21 and the first receiving optical fiber 22 can be understood as a first transmitting single-core fiber and a first receiving single-core fiber, respectively. The number of first transmitting optical fibers 21 is the same as the total number of transmitting cores 11 of all the multicore fibers 10. In the example of FIG. 1, since each of the two multicore fibers 10 includes two transmitting cores 11, the total number of transmitting cores 11 is four, and the number of first transmitting optical fibers 21 is four. In addition, the number of first receiving optical fibers 22 is the same as the total number of receiving cores 12 of all the multicore fibers 10. In the example of FIG. 1, since each of the two multicore fibers 10 includes two receiving cores 12, the total number of receiving cores 12 is four, and the number of first receiving optical fibers 22 is four.

In addition, in the optical input/output device 1 of one or more embodiments, all the multicore fibers 10 are longer than each first transmitting optical fiber 21 and each first receiving optical fiber 22. However, all the multicore fibers 10 may be shorter than each first transmitting optical fiber 21 and each first receiving optical fiber 22.

The fan-in/fan-out device 30 optically couples each core at one end of each of the first transmitting optical fibers 21 and each of the transmitting cores 11, and optically couples each core at one end of each of the first receiving optical fibers 22 and each of the receiving cores 12. The fan-in/fan-out device 30 may be a device of a spatial optical system that performs the above coupling via a space, or may be a device of a waveguide system that performs the above coupling via a waveguide formed in the device. In FIG. 1, an example of an optical path of transmission light in the fan-in/fan-out device 30 is indicated by a broken line, and an example of an optical path of reception light is indicated by a dotted line. Therefore, it may be understood that the core of the multicore fiber 10 that is optically connected to the first transmitting optical fiber 21 is the transmitting core 11, and the core of the multicore fiber 10 that is optically connected to the first receiving optical fiber 22 is the receiving core 12.

In the device of the spatial optical system, for example, a lens is used. In this case, one end of each of the first transmitting optical fibers 21 and one end of each of the first receiving optical fibers 22 are arranged similarly to arrangement of each of the transmitting cores 11 and each of the receiving cores 12 to be coupled, and the lens is arranged between the multicore fiber 10, and the first transmitting optical fiber 21 and the first receiving optical fiber 22. Then, positions of the respective multicore fibers 10, the lenses, the first transmitting optical fibers 21, and the first receiving optical fibers 22 are adjusted in such a way that the above-described coupling is performed. Therefore, each light emitted from the core of each of the first transmitting optical fibers 21 is refracted by the lens and is incident on the transmitting core 11 of the multicore fiber 10, and each light emitted from each of the receiving cores 12 of the multicore fiber 10 is refracted by the lens and is incident on the core of each of the first receiving optical fibers 22.

In the device of the waveguide system, for example, a waveguide substrate in which the waveguide is three-dimensionally formed is used. In this case, for example, one ends of a plurality of waveguides connected to the core of each of the first transmitting optical fibers 21 and the core of each of the receiving cores 12 are linearly arranged on one end side of the waveguide substrate, a position of the waveguide is changed by forming a part of the waveguide in a curved shape in the waveguide substrate, and the waveguides are arranged on the other end side of the waveguide substrate similarly to arrangement of each of the transmitting cores 11 and each of the receiving cores 12 in each of the multicore fibers 10. In this way, the above coupling is performed. Therefore, each light emitted from the core of each of the first transmitting optical fibers 21 propagates through the waveguide and is incident on the transmitting core 11 of the multicore fiber 10, and each light emitted from each of the receiving cores 12 of the multicore fiber 10 propagates through the waveguide and is incident on the core of each of the first receiving optical fibers 22.

The transmission/reception connector 40 includes transmission connector ports 41 whose number is equal to the number of first transmitting optical fibers 21, the transmission connector ports 41 being connected to the other ends of the respective first transmitting optical fibers 21 in a one-to-one correspondence, and reception connector ports 42 whose number is equal to the number of first receiving optical fibers 22, the reception connector ports 42 being connected to the other ends of the respective first receiving optical fibers 22 in a one-to-one correspondence. Therefore, the number of plurality of connector ports including the respective transmission connector ports 41 and the respective reception connector ports 42 is the same as the total number of first transmitting optical fibers 21 and first receiving optical fibers 22. Each of the transmission connector ports 41 can optically couple the core of each of the first transmitting optical fibers 21 and the transmission port 101 of the transceiver 100 via the patch cord 3 to be described later. In addition, each of the reception connector ports 42 can optically couple the core of each of the first receiving optical fibers 22 and the reception port 102 of the transceiver 100 via the patch cord 3. FIG. 1 illustrates a state in which the core of each of the first transmitting optical fibers 21 and the transmission port 101 of the transceiver 100 are optically coupled, and the core of each of the first receiving optical fiber 22 and the reception port 102 of the transceiver 100 are optically coupled.

In addition, the transmission/reception connector 40 includes dummy ports 43 that do not transmit and receive light. In one or more embodiments, the number of dummy ports 43 is the same as the number of unused ports 103 of the transceiver 100, and the dummy ports are linearly arranged. The respective transmission connector ports 41, the respective dummy ports 43, and the respective reception connector ports 42 are arranged similarly to the respective transmission ports 101, the respective unused ports 103, and the respective reception ports 102 in the transceiver 100. Therefore, the respective transmission connector ports 41 are arranged on one side of the dummy ports 43, and the respective reception connector ports 42 are arranged on the other side of the dummy ports 43. Since the respective transmission connector ports 41 are arranged in a group and the respective reception connector ports 42 are arranged in a group as described above, at least some of the first transmitting optical fibers 21 and at least some of the first receiving optical fibers 22 are arranged in such a way as to intersect with each other in the example of FIG. 1. In a case where one ends of the respective first transmitting optical fibers 21 are arranged in a group, one ends of the respective first receiving optical fibers 22 are arranged in a group, and the core of each of the first transmitting optical fibers 21 and the core of each of the first receiving optical fibers 22 and the fan-in/fan-out device 30 are coupled, the first transmitting optical fiber 21 and the first receiving optical fiber 22 do not have to be arranged in such a way as to intersect with each other unlike the example of FIG. 1.

As illustrated in FIG. 1, in one or more embodiments, the cores of the respective first transmitting optical fibers 21 connected to the pair of adjacent transmission connector ports 41 are optically coupled to the transmitting cores 11 of different multicore fibers 10 via the fan-in/fan-out device 30. The cores of the respective first receiving optical fibers 22 connected to the pair of adjacent reception connector ports 42 are optically coupled to the receiving cores 12 of different multicore fibers 10 via the fan-in/fan-out device 30.

In one or more embodiments, a part of each multicore fiber 10, the fan-in/fan-out device 30, each first transmitting optical fiber 21, and each first receiving optical fiber 22 are accommodated in the space of the housing 2, and the transmission/reception connector 40 is fixed to a wall surface of the housing 2. The other part of each multicore fiber 10 is led out from the housing 2. In the optical input/output device 1 of one or more embodiments, the lengths of all the multicore fibers 10 in the housing 2 may be longer than the lengths of each of the first transmitting optical fibers 21 and each of the first receiving optical fibers 22 in the housing 2. However, the lengths of all the multicore fibers 10 in the housing 2 may be shorter than the lengths of each of the first transmitting optical fibers 21 and each of the first receiving optical fibers 22 in the housing 2. The entire multicore fibers 10 may be arranged in the housing 2. In addition, the transmission/reception connector 40 may be fixed to the wall surface of the housing 2 via an adapter (not illustrated).

Next, the patch cord 3 will be described. The patch cord 3 includes second transmitting optical fibers 61 whose number is equal to the number of first transmitting optical fibers 21, second receiving optical fibers 62 whose number is equal to the number of first receiving optical fibers 22, a first intermediate connector 50 connected to one ends of the second transmitting optical fibers 61 and the second receiving optical fibers 62, and a second intermediate connector 70 connected to the other ends of the second transmitting optical fibers 61 and the second receiving optical fibers 62.

Each of the second transmitting optical fiber 61 and the second receiving optical fiber 62 is a single-core fiber. Therefore, the second transmitting optical fiber 61 and the second receiving optical fiber 62 can be understood as a second transmitting single-core fiber and a second receiving single-core fiber, respectively. In one or more embodiments, the second transmitting optical fiber 61 is longer than the first transmitting optical fiber 21, and the second receiving optical fiber 62 is longer than the first receiving optical fiber 22. Further, an outer diameter of a cladding of each of the second transmitting optical fiber 61 and the second receiving optical fiber 62 is larger than an outer diameter of a cladding of each of the first transmitting optical fiber 21 and the first receiving optical fiber 22. Therefore, microbending losses of the second transmitting optical fiber 61 and the second transmitting optical fiber 61 tend to be smaller than microbending losses of the first transmitting optical fiber 21 and the first receiving optical fiber 22. In addition, due to a relationship of the outer diameter of the cladding as described above, a bending breakage probability of the first transmitting optical fiber 21 and the first receiving optical fiber 22 tends to be lower than that of the second transmitting optical fiber 61 and the second receiving optical fiber 62. An optical confinement power of each of the first transmitting optical fiber 21 and the first receiving optical fiber 22 is larger than an optical confinement power of each of the second transmitting optical fiber 61 and the second receiving optical fiber 62. Examples of the configuration having such a relationship of optical confinement power include a configuration in which a relative refractive index difference between the cores of the first transmitting optical fiber 21 and the first receiving optical fiber 22 is larger than a relative refractive index difference between the cores of the second transmitting optical fiber 61 and the second receiving optical fiber 62. In this case, a refractive index of the core of each of the first transmitting optical fiber 21 and the first receiving optical fiber 22 may be higher than a refractive index of the core of each of the second transmitting optical fiber 61 and the second receiving optical fiber 62. Alternatively, each of the first transmitting optical fiber 21 and the first receiving optical fiber 22 may include a core, a cladding surrounding the core and having a refractive index lower than that of the core, and a trench layer surrounding the core, surrounded by the cladding, and having a refractive index lower than that of the cladding. Each of the second transmitting optical fiber 61 and the second receiving optical fiber 62 may have a core and a cladding surrounding the core and having a refractive index lower than that of the core, and does not have to include a trench layer surrounding the core, surrounded by the cladding, and having a refractive index lower than that of the cladding.

The first intermediate connector 50 includes first intermediate transmission connector ports 51 whose number is equal to the number of second transmitting optical fibers 61, the first intermediate transmission connector ports 51 being connected to one ends of the respective second transmitting optical fibers 61, and first intermediate reception connector ports 52 whose number is equal to the number of second receiving optical fibers 62, the first intermediate reception connector ports 52 being connected to one ends of the respective second receiving optical fibers 62. Therefore, the number of first intermediate connector ports including the respective first intermediate transmission connector ports 51 and the respective first intermediate reception connector ports 52 is the same as the total number of second transmitting optical fibers 61 and second receiving optical fibers 62.

In one or more embodiments, the first intermediate connector 50 includes dummy ports 53 that do not transmit and receive light. In one or more embodiments, the number of dummy ports 53 is the same as the number of dummy ports 43, and the dummy ports 53 are arranged similarly to the dummy ports 43. The respective first intermediate transmission connector ports 51, the respective dummy ports 53, and the respective first intermediate reception connector ports 52 are arranged similarly to the respective transmission connector ports 41, the respective dummy ports 43, and the respective reception connector ports 42 in the transmission/reception connector 40. Therefore, the respective first intermediate transmission connector ports 51 are arranged on one side of the dummy ports 53, and the respective first intermediate reception connector ports 52 are arranged on the other side of the dummy ports 53.

The first intermediate connector 50 is positioned by an adapter (not illustrated) or the like and connected to the transmission/reception connector 40. Therefore, each of the first intermediate transmission connector ports 51 is connected to each of the transmission connector ports 41 of the transmission/reception connector 40, and each of the first intermediate reception connector ports 52 is connected to each of the reception connector ports 42 of the transmission/reception connector 40. As a result, the core at the other end of the first transmitting optical fiber 21 connected to each of the transmission connector ports 41 and the core of the second transmitting optical fiber 61 connected to each of the first intermediate transmission connector ports 51 are optically coupled, and the core at the other end of the first receiving optical fibers 22 connected to each of the reception connector ports 42 and the core of the second receiving optical fiber 62 connected to each of the first intermediate reception connector ports 52 are optically coupled.

The second intermediate connector 70 includes second intermediate transmission connector ports 71 whose number is equal to the number of second transmitting optical fibers 61, the second intermediate transmission connector ports 71 being connected to the other ends of the respective second transmitting optical fibers 61, and second intermediate reception connector ports 72 whose number is equal to the number of second receiving optical fibers 62, the second intermediate reception connector ports 72 being connected to the other ends of the respective second receiving optical fibers 62. Therefore, the number of second intermediate connector ports including the respective second intermediate transmission connector ports 71 and the respective second intermediate reception connector ports 72 is the same as the total number of second transmitting optical fibers 61 and second receiving optical fibers 62.

In one or more embodiments, the second intermediate connector 70 includes dummy ports 73 that do not transmit and receive light. In one or more embodiments, the number of dummy ports 73 is the same as the number of unused ports 103 of the transceiver 100, and the dummy ports 73 are arranged similarly to the unused ports 103. The respective second intermediate transmission connector ports 71, the respective dummy ports 73, and the respective second intermediate reception connector ports 72 are arranged similarly to the respective transmission ports 101, the respective unused ports 103, and the respective reception ports 102 in the transceiver 100. Therefore, the respective second intermediate transmission connector ports 71 are arranged on one side of the dummy ports 73, and the respective second intermediate reception connector ports 72 are arranged on the other side of the dummy ports 73.

The second intermediate connector 70 can be connected to the transceiver 100. Therefore, each of the second intermediate transmission connector ports 71 can be connected to each of the transmission ports 101 of the transceiver 100, and each of the second intermediate reception connector ports 72 can be connected to each of the reception ports 102 of the transceiver 100. FIG. 1 illustrates a state in which each of the second intermediate transmission connector ports 71 is connected to each of the transmission ports 101, and each of the second intermediate reception connector ports 72 is connected to each of the reception ports 102. In this state, each of the second intermediate transmission connector ports 71 optically couples the core of each of the second transmitting optical fibers 61 and the transmission port 101 of the transceiver 100. In addition, each of the second intermediate reception connector ports 72 optically couples the core of each of the second receiving optical fibers 62 and the reception port 102 of the transceiver 100.

Therefore, the optical signal transmitted from the transmission port 101 of the transceiver 100 propagates to the transmitting core 11 of the multicore fiber 10 via the second transmitting optical fiber 61, the first transmitting optical fiber 21, and the fan-in/fan-out device 30. The optical signal propagating through the receiving core 12 of the multicore fiber 10 is output from the receiving core 12 and received by the reception port 102 of the transceiver 100 via the fan-in/fan-out device 30, the first receiving optical fiber 22, and the second receiving optical fiber 62.

As described above, the optical input/output device 1 of one or more embodiments includes at least one multicore fibers 10 including at least one transmitting cores 11 and at least one receiving cores 12, the first transmitting optical fibers 21 whose number is equal to the total number of transmitting cores 11 of all the multicore fibers 10, the first receiving optical fibers 22 whose number is equal to the total number of receiving cores 12 of all the multicore fibers 10, the fan-in/fan-out device 30 that optically couples each core at one end of each of the first transmitting optical fibers 21 and each of the transmitting cores 11, and optically couples each core at one end of each of the first receiving optical fibers 22 and each of the receiving cores 12, and the transmission/reception connector 40 that includes the transmission connector ports 41 whose number is equal to the number of first transmitting optical fibers 21, the transmission connector ports 41 being connected to the other ends of the respective first transmitting optical fibers 21 and configured to optically couple the cores of the respective first transmitting optical fibers 21 and the transmission ports 101 of the transceiver 100, and the reception connector ports 42 whose number is equal to the number of first receiving optical fibers 22, the reception connector ports 42 being connected to the other ends of the respective first receiving optical fibers 22 and configured to optically couple the cores of the respective first receiving optical fibers 22 and the reception ports 102 of the transceiver 100.

With such an optical input/output device 1, the optical signals transmitted from the transmission ports 101 of the transceiver 100 propagate to the transmitting cores 11 of all the multicore fibers 10 via the first transmitting optical fibers 21, and the optical signals received by the reception ports 102 of the transceiver 100 propagate to the receiving cores 12 via the first receiving optical fibers 22. Therefore, a direction in which light propagates to the transmitting core 11 and a direction in which light propagates to the receiving core 12 in the multicore fiber 10 are opposite to each other. Therefore, even when crosstalk occurs between the transmitting core 11 and the receiving core 12, in a case of light crosstalk from the transmitting core 11 to the receiving core 12, the light is not received by the transceiver 100, and in a case of light crosstalk from the receiving core 12 to the transmitting core 11, the light does not propagate to a transmission destination. Therefore, with the optical input/output device 1 according to one or more embodiments of the present invention, crosstalk that affects communication can be reduced.

In addition, the multicore fiber 10 of one or more embodiments and the core pair adjacent to each other at the shortest distance are the transmitting/receiving core pair including the transmitting core 11 and the receiving core 12. The crosstalk tends to increase as the core pitch decreases. Therefore, since the core pair adjacent to each other at the shortest distance is the transmitting/receiving core pair, it is possible to reduce crosstalk that affects communication as compared with a case where all the core pairs adjacent to each other at the shortest distance are the core pairs of the transmitting cores 11 or the core pairs of the receiving cores 12. In one or more embodiments, in each multicore fiber 10, all the core pairs adjacent to each other at the shortest distance are the transmitting/receiving core pairs.

In addition, in the optical input/output device 1 of one or more embodiments, the number of multicore fibers 10 is plural, the cores of the respective first transmitting optical fibers 21 connected to a pair of transmission connector ports 41 adjacent to each other are optically coupled to the transmitting cores 11 of different multicore fibers 10, and the cores of the respective first receiving optical fibers 22 connected to a pair of reception connector ports 42 adjacent to each other are optically coupled to the receiving cores 12 of different multicore fibers 10. The first transmitting optical fibers 21 connected to the pair of transmission connector ports 41 adjacent to each other tend to be optically coupled to the pair of transmission ports 101 adjacent to each other in the transceiver 100, and the first receiving optical fibers 22 connected to the pair of reception connector ports 42 adjacent to each other tend to be optically coupled to the pair of reception ports 102 adjacent to each other in the transceiver 100. Meanwhile, in the transceiver 100, in general, crosstalk is likely to occur between lights emitted from the transmission ports 101 adjacent to each other or between electrical signals of these lights, and crosstalk is likely to occur between lights emitted from the reception ports 102 adjacent to each other or between electrical signals obtained by converting these lights. However, even in a case where such crosstalk occurs, with such a configuration, crosstalk between the respective optical signals propagating through the cores of the pair of first transmitting optical fibers 21 in which crosstalk has occurred in the transceiver 100 in the multicore fiber 10 is suppressed, and crosstalk between the respective optical signals propagating through the cores of the pair of first receiving optical fibers 22 in which crosstalk has occurred in the transceiver 100 in the multicore fiber 10 is suppressed. Therefore, it is possible to reduce crosstalk that affects communication as compared with a case where a pair of first transmitting optical fibers 21 connected to a pair of connector ports adjacent to each other is coupled to the transmitting cores 11 of the same multicore fiber 10 or a case where a pair of first receiving optical fibers 22 connected to a pair of connector ports adjacent to each other is coupled to the receiving cores 12 of the same multicore fiber 10.

In addition, in the optical input/output device 1 of one or more embodiments, all the multicore fibers 10 are longer than each first transmitting optical fiber 21 and each first receiving optical fiber 22. In the multicore fiber 10, since a difference is unlikely to occur in the length between the arranged cores, skew is unlikely to occur, but in the first transmitting optical fiber 21 and the first receiving optical fiber 22, a difference is likely to occur in the length between the respective cores, and skew is likely to occur. Therefore, all the multicore fibers 10 are longer than each of the first transmitting optical fibers 21 and each of the first receiving optical fibers 22 as in one or more embodiments, and thus, a proportion of a transmission path of the single-core fiber can be reduced, and skew can be suppressed as compared with a case where all the multicore fibers 10 are shorter than each of the first transmitting optical fibers 21 and each of the first receiving optical fibers 22. If the lengths of all the multicore fibers 10 in the housing 2 are longer than the lengths of each of the first transmitting optical fibers 21 and each of the first receiving optical fibers 22 in the housing 2, skew in the housing 2 can be suppressed.

In the optical input/output device 1 of one or more embodiments, the optical confinement power of each of the first transmitting optical fiber 21 and the first receiving optical fiber 22 is larger than the optical confinement power of each of the second transmitting optical fiber 61 and the second receiving optical fiber 62. Alternatively, each of the first transmitting optical fiber 21 and the first receiving optical fiber 22 includes the trench layer, and each of the second transmitting optical fiber 61 and the second receiving optical fiber 62 does not include the trench layer. Further, the outer diameter of the cladding of each of the second transmitting optical fiber 61 and the second receiving optical fiber 62 is larger than the outer diameter of the cladding of each of the first transmitting optical fiber 21 and the first receiving optical fiber 22. Therefore, as described above, the microbending losses of the second transmitting optical fiber 61 and the second receiving optical fiber 62 tend to be smaller than the microbending losses of the first transmitting optical fiber 21 and the first receiving optical fiber 22, and the bending breakage probability of the first transmitting optical fiber 21 and the first receiving optical fiber 22 tends to be lower than that of the second transmitting optical fiber 61 and the second receiving optical fiber 62. The first transmitting optical fiber 21, the first receiving optical fiber 22, the fan-in/fan-out device 30, and the multicore fiber 10 of the optical input/output device 1 tend to be at least partially accommodated in the housing 2 as in one or more embodiments. Therefore, since the first transmitting optical fiber 21 and the first receiving optical fiber 22 are arranged in a limited space, the first transmitting optical fiber 21 and the first receiving optical fiber 22 arranged in the housing 2 tend to be bent with a smaller curvature than that of the second transmitting optical fiber 61 and the second receiving optical fiber 62 of the patch cord 3 arranged outside the housing 2. Therefore, the optical confinement power of each of the first transmitting optical fiber 21 and the first receiving optical fiber 22 is greater than the optical confinement power of each of the second transmitting optical fiber 61 and the second receiving optical fiber 62, it is thus possible to suppress a bending loss of light in the first transmitting optical fiber 21 and the first receiving optical fiber 22. In addition, with such a relationship of the optical confinement power, the refractive index of the core of each of the second transmitting optical fiber 61 and the second receiving optical fiber 62 can be made smaller than the refractive index of the core of each of the first transmitting optical fiber 21 and the first receiving optical fiber 22 as described above. In this case, the amount of dopant for increasing the refractive index added to the core of each of the second transmitting optical fiber 61 and the second receiving optical fiber 62 can be reduced, and a loss due to Rayleigh scattering in the second transmitting optical fiber 61 and the second receiving optical fiber 62 that tend to be longer than the first transmitting optical fiber 21 and the first receiving optical fiber 22 can be suppressed. In addition, even in a case where the first transmitting optical fiber 21 and the first receiving optical fiber 22 include the trench layer, it is possible to suppress a bending loss of light in the first transmitting optical fiber 21 and the first receiving optical fiber 22. In addition, although the optical fiber including the trench layer can suppress the bending loss as described above, a transmission loss in transmission of light over a long distance tends to be larger than that of the optical fiber that does not include the trench layer. Therefore, as described above, since the second transmitting optical fiber 61 and the second receiving optical fiber 62 that tend to be longer than the first transmitting optical fiber 21 and the first receiving optical fiber 22 do not include the trench layer, a transmission loss of light in the second transmitting optical fiber 61 and the second receiving optical fiber 62 can be suppressed, and a loss of light in the optical input/output device 1 can be suppressed. In addition, since a bending breakage coefficient of the first transmitting optical fiber 21 and the first receiving optical fiber 22 can be made smaller than a bending breakage coefficient of the second transmitting optical fiber 61 and the second receiving optical fiber 62 as described above, even when the first transmitting optical fiber 21 and the first receiving optical fiber 22 are bent at a curvature larger than that of the second transmitting optical fiber 61 and the second receiving optical fiber 62, breakage of the first transmitting optical fiber 21 and the first receiving optical fiber 22 can be suppressed.

Although the present invention has been described with reference to the above-described embodiments as non-limiting example, the present invention is not limited to the above-described embodiments.

For example, the optical input/output device 1 including two multicore fibers 10 has been described as an example in the above embodiments. However, the optical input/output device of the present invention may include three or more multicore fibers, or may include only one multicore fiber.

In addition, an example in which each multicore fiber 10 includes two transmitting cores 11 and two receiving cores 12 has been described. However, as long as the multicore fiber includes at least one transmitting core 11 and at least one receiving core, the number of transmitting cores 11 and the number of receiving cores 12 may be one or three or more, and the number of transmitting cores 11 and the number of receiving cores 12 may be different from each other. In general, in the transceiver 100, since the transmission ports 101 and the reception ports 102 are provided in a one-to-one correspondence, the total number of transmitting cores 11 and the total number of receiving cores 12 of all the multicore fibers 10 may be equal to each other.

In addition, in the above embodiments, an example in which the core pair adjacent to each other at the shortest distance in each of the multicore fibers 10 are the transmitting/receiving core pair including the transmitting core 11 and the receiving core 12 has been described. However, for example, at least some of the core pairs adjacent to each other at the shortest distance may be a core pair of the transmitting cores 11 or a core pair of the receiving cores 12. Examples of such a multicore fiber include a multicore fiber in which odd-numbered cores are arranged in an annular shape, and only one of core pairs adjacent to each other at the shortest distance is a core pair of the transmitting cores 11 and a core pair of the receiving cores 12. In addition, in only some multicore fibers, at least some of the core pairs adjacent to each other at the shortest distance may be the transmitting/receiving core pairs. An example in which all the core pairs adjacent to each other at the shortest distance are the transmitting/receiving core pairs is not limited to the above embodiments. For example, three or more transmitting cores 11 and three or more receiving cores 12 may be provided, and the transmitting cores 11 and the receiving cores 12 may be alternately arranged in an annular shape.

In addition, the arrangement of the cores in each multicore fiber 10 is not limited to the above embodiments. For example, a plurality of cores may be arranged linearly. In this case, the transmitting cores 11 and the receiving cores 12 may be alternately arranged in such a way that all the core pairs adjacent to each other at the shortest distance become the transmitting/receiving core pairs.

Figure 2:
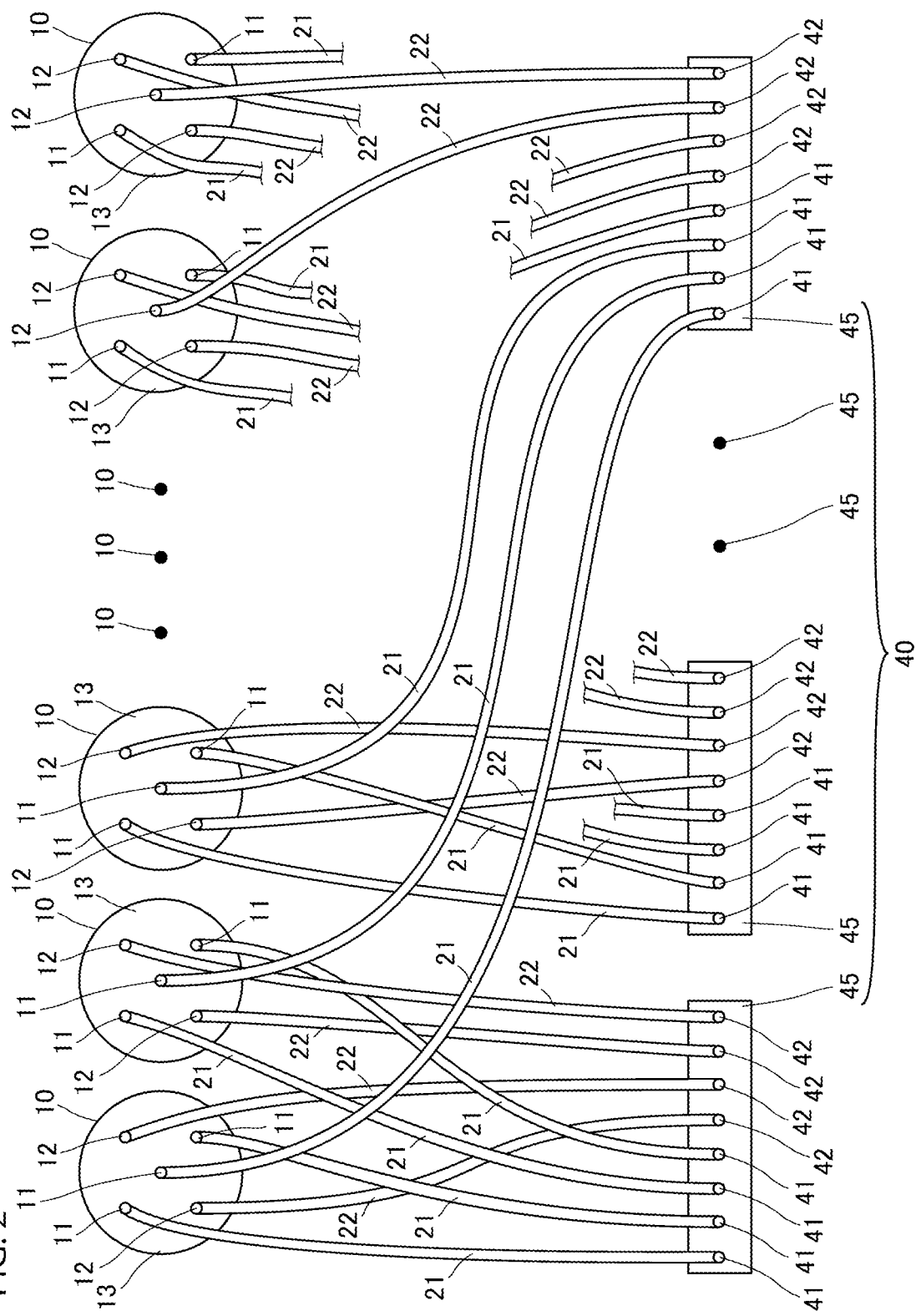
FIG. 2 is a view illustrating one or more embodiments of optical coupling of multicore fibers, single-core fibers, and a transmission/reception connector.

In addition, the multicore fiber 10 in the optical input/output device 1 according to one or more embodiments of the present invention may include a central core arranged at the center of the cladding 13 and a plurality of outer cores arranged in such a way as to surround the central core. In this case, the central core is the transmitting core 11 or the receiving core 12, and the plurality of outer cores include at least one transmitting core 11 and at least one receiving core 12. FIG. 2 is a view illustrating an example of optical coupling of the multicore fiber 10, the first transmitting optical fiber 21, the first receiving optical fiber 22, and the transmission/reception connector 40 in a case where such a multicore fiber 10 is used. Components similar to those in the above embodiments are denoted by the same reference signs as those in the above embodiments, and a description thereof will be omitted unless otherwise specified. In FIG. 2, in order to avoid complication of the drawing, only the multicore fiber 10, the first transmitting optical fiber 21, the first receiving optical fiber 22, and the transmission/reception connector 40 are illustrated, and the fan-in/fan-out device 30 is omitted. Therefore, FIG. 2 does not mean that the first receiving optical fiber 22 and the transmission/reception connector 40 are directly connected to the multicore fiber 10.

As illustrated in FIG. 2, in this example, the optical input/output device 1 includes a plurality of multicore fibers 10. The number of multicore fibers 10 in this example is, for example, eight. However, in FIG. 2, in order to avoid complication of the drawing, some multicore fibers 10 are indicated by dots. In the first half of the respective multicore fibers 10, the central core arranged at the center of the cladding 13 is the transmitting core 11, and in the second half of the multicore fibers 10, the central core arranged at the center of the cladding 13 is the receiving core 12. In each multicore fiber 10, two transmitting cores 11 are arranged diagonally around the central core as a part of the outer cores, and two receiving cores 12 are arranged diagonally around the central core as the other part of the outer cores. Therefore, when only the outer cores are considered, the transmitting core 11 and the receiving core 12 are adjacent to each other.

Furthermore, in this example, the transmission/reception connector 40 includes a plurality of partial connectors 45. Each of the partial connectors 45 includes two or more connector ports among all the connector ports of the transmission/reception connector 40. In a case where the number of multicore fibers 10 is eight as described above, the transmission/reception connector 40 includes, for example, five 8-port partial connectors 45. In the example illustrated in FIG. 2, each partial connector 45 includes the transmission connector ports 41 and the reception connector ports 42 of which the numbers are equal to each other, and the number of connector ports including the transmission connector ports 41 and the reception connector ports 42 is the same as the total number of transmitting cores 11 and receiving cores 12 of the multicore fiber 10. However, in FIG. 2, some partial connectors 45 are indicated by dots in order to avoid complication of the drawing.

Then, the first transmitting optical fiber 21 optically coupled to the transmitting core 11 which is the central core of the first half of the multicore fibers 10 is connected to the transmission connector port 41 of a specific partial connector 45, and the first receiving optical fiber 22 optically coupled to the receiving core 12 which is the central core of the second half of the multicore fibers 10 is connected to the reception connector port 42 of the specific partial connector 45. In FIG. 2, the specific partial connector 45 is the rightmost partial connector 45. In addition, each of the first transmitting optical fibers 21 connected to each of the transmitting cores 11 which are the outer cores of each of the multicore fibers 10 is connected to the transmission connector port 41 of the partial connector 45 other than the specific partial connector 45, and each of the first receiving optical fibers 22 connected to each of the receiving cores 12 which are the outer cores of each of the multicore fibers 10 is connected to the reception connector port 42 of the partial connector 45 other than the specific partial connector 45. Some connection relationships are omitted in the example of FIG. 2. Each of the first transmitting optical fibers 21 connected to the transmitting core 11 which is the outer core of one multicore fiber 10 and each of the first receiving optical fibers 22 connected to each of the receiving cores 12 which are the outer cores are connected to the transmission connector port 41 and the reception connector port 42 of the same partial connector 45.

Although not particularly illustrated, in a modification of FIG. 2, the central core of each multicore fiber 10 may be the transmitting core 11. In this case, the specific partial connector 45 includes the transmission connector ports 41 whose number is equal to the number of multicore fibers 10, and the first transmitting optical fiber 21 connected to each of the transmission connector ports 41 of the specific partial connector 45 is optically coupled to the central core of each multicore fiber 10. Alternatively, the central core of each multicore fiber 10 may be the receiving core 12. In this case, the specific partial connector 45 includes the reception connector ports 42 whose number is equal to the number of multicore fibers 10, and the first receiving optical fiber 22 connected to each of the reception connector ports 42 of the specific partial connector 45 is optically coupled to the central core of each multicore fiber 10.

In the example of FIG. 2 and the modification thereof, the first transmitting optical fiber 21 or the first receiving optical fiber 22 optically coupled to the central core of each multicore fiber 10 is connected to the connector port of the specific partial connector 45, and the first transmitting optical fiber 21 connected to each of the transmitting cores 11 that are the outer cores and the first receiving optical fiber 22 connected to each of the receiving cores 12 that are the outer cores are connected to the connector ports of the partial connector 45 other than the specific partial connector 45. In general, light propagating through the central core is affected by crosstalk from each of the surrounding cores arranged therearound. Therefore, as described above, when the single-core fibers each including the core optically coupled to the central core are collectively connected to the specific partial connector 45, light largely affected by crosstalk is collected from the specific partial connector 45 to one transceiver, and connection is easily made. Therefore, it is possible to easily perform appropriate processing for crosstalk by the transceiver.

In general, in a case where the multicore fiber is connected, the outer core is affected by misalignment of an axial center of the fiber in a rotation direction, and thus, a connection loss tends to be larger than that of the central core. Furthermore, an influence of the misalignment in the rotation direction is substantially the same between the outer cores arranged at equal distances from the center of the multicore fiber. Therefore, since the respective optical fibers connected to the outer cores of one multicore fiber 10 are connected to the connector ports of the same partial connector 45 as in the example of FIG. 2, it is possible to suppress fluctuation of the connection loss between the connector ports in each partial connector 45. Therefore, the transceiver 100 to which the partial connector 45 is connected can easily perform processing on the connection loss.

In the above embodiments, an example in which the cores of the respective first transmitting optical fibers 21 connected to a pair of transmission connector ports 41 adjacent to each other are optically coupled to the transmitting cores 11 of different multicore fibers 10, and the cores of the respective first receiving optical fibers 22 connected to a pair of reception connector ports 42 adjacent to each other are optically coupled to the receiving cores 12 of different multicore fibers 10 has been described. However, the cores of the respective first transmitting optical fibers 21 connected to the pair of transmission connector ports 41 adjacent to each other may be optically coupled to the transmitting cores 11 of one multicore fiber 10, and the cores of the respective first receiving optical fibers 22 connected to the pair of reception connector ports 42 adjacent to each other may be optically coupled to the receiving cores 12 of one multicore fiber 10.

Figure 3:
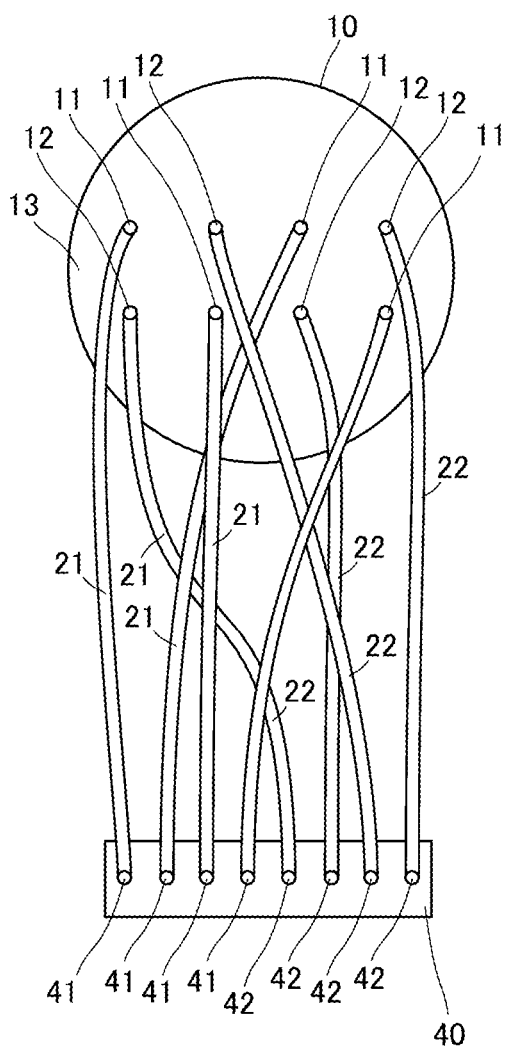
FIG. 3 is a view illustrating one or more embodiments of optical coupling of the multicore fibers, the single-core fibers, and the transmission/reception connector.

FIG. 3 is a view illustrating one or more embodiments of optical coupling of the multicore fiber 10, the first transmitting optical fiber 21, the first receiving optical fiber 22, and the transmission/reception connector 40 in a case where such a multicore fiber 10 is used. As illustrated in FIG. 3, in the multicore fiber 10 of this example, the transmitting cores 11 and the receiving cores 12 are alternately arranged. Therefore, the core pair adjacent to each other at the shortest distance is the transmitting/receiving core pair. The first transmitting optical fibers 21 connected to the adjacent transmission connector ports 41 of the transmission/reception connector 40 are optically coupled to a pair of transmitting cores 11 other than the core pair adjacent to each other at the shortest distance in the multicore fiber 10, respectively, and the first receiving optical fibers 22 connected to the adjacent reception connector ports 42 are optically coupled to a pair of receiving cores 12 other than the core pair adjacent to each other at the shortest distance in the multicore fiber 10, respectively. In addition, in the example of FIG. 3, the receiving core 12 is positioned between a pair of transmitting cores 11 of the multicore fiber 10 to which the cores of the respective first transmitting optical fibers 21 connected to a pair of transmission connector ports 41 adjacent to each other are optically coupled, and the transmitting core 11 is positioned between a pair of receiving cores 12 of the multicore fiber 10 to which the cores of the respective first receiving optical fibers 22 connected to a pair of reception connector ports 42 adjacent to each other are optically coupled.

Although different from FIG. 3, the first transmitting optical fibers 21 connected to the adjacent transmission connector ports 41 of the transmission/reception connector 40 may be optically coupled to the pair of transmitting cores 11 adjacent to each other via the receiving core 12 of the multicore fiber 10, and the first receiving optical fibers 22 connected to the adjacent reception connector ports 42 may be optically coupled to the pair of receiving cores 12 adjacent to each other via the transmitting core 11 of the multicore fiber 10.

With such a configuration, even in a case where crosstalk occurs between the first transmitting optical fibers 21 or between the first receiving optical fibers 22 at a pair of connector ports adjacent to each other in the transmission/reception connector 40, it is possible to suppress crosstalk in the multicore fiber 10 as compared with a case where the cores of a pair of first transmitting optical fibers 21 in which crosstalk has occurred are coupled to a pair of transmitting cores 11 adjacent to each other at the shortest distance in the multicore fiber 10, or the cores of a pair of first receiving optical fibers 22 in which crosstalk has occurred are coupled to a pair of receiving cores 12 adjacent to each other at the shortest distance in the multicore fiber 10. In addition, in this example, the receiving core 12 is positioned between the pair of transmitting cores 11 to which the cores of the respective first transmitting optical fibers 21 connected to the pair of transmission connector ports 41 adjacent to each other are optically coupled, and the transmitting core 11 is positioned between the pair of receiving cores 12 to which the cores of the respective first receiving optical fibers 22 connected to the pair of reception connector ports 42 adjacent to each other are optically coupled. Therefore, it is possible to suppress crosstalk affecting communication as compared with a case where the receiving core 12 is not positioned between the pair of transmitting cores 11 and a case where the transmitting core 11 is not positioned between the pair of receiving cores 12.

In one or more embodiments of the present invention, the patch cord 3 is not essential, and the transmission connector port 41 and the reception connector port 42 of the transmission/reception connector 40 may be connected to the transmission port 101 and the reception port 102 of the transceiver 100, respectively, by other means. In addition, the transmission/reception connector 40 is not essential, and for example, the first transmitting optical fiber 21 and the second transmitting optical fiber 61 may be fusion-spliced, or the first receiving optical fiber 22 and the second receiving optical fiber 62 may be fusion-spliced. In this case, the fusion-spliced portion may be positioned in the housing 2 or may be positioned outside the housing 2, and may be positioned in the housing 2 from the viewpoint of suppressing breakage due to external damage. Alternatively, the second transmitting optical fiber 61 may be connected to the transmission port 101 of the transceiver 100, and the second receiving optical fiber 62 may be connected to the reception port 102 of the transceiver 100. In addition, the first transmitting optical fiber 21 may be provided in a state of being fusion-spliceable to the second transmitting optical fiber 61 without being directly fusion-spliced to the second transmitting optical fiber 61, and the first receiving optical fiber 22 may be provided in a state of being fusion-spliceable to the second receiving optical fiber 62 without being fusion-spliced to the second receiving optical fiber 62. In a case where the housing 2 is provided, a fusion splicing point between the first transmitting optical fiber 21 and the second transmitting optical fiber 61 may be inside the housing 2, and a fusion splicing point between the first receiving optical fiber 22 and the second receiving optical fiber 62 may be outside the housing 2. In either case, at least a part of the first transmitting optical fiber 21 is accommodated in the housing 2, and at least a part of the first receiving optical fiber 22 is arranged outside the housing 2. Alternatively, at least a part of the second transmitting optical fiber 61 is accommodated in the housing 2, and at least a part of the second receiving optical fiber 62 is arranged outside the housing 2. The transmission/reception connector 40 may be positioned outside the housing 2. In this case, the degree of freedom of the arrangement position of the transmission/reception connector 40 can be increased. In a case where the transmission/reception connector 40 and the first intermediate connector 50 are connected to each other, the degree of freedom of the arrangement positions of the first intermediate connector 50 and the transmission/reception connector 40 can be increased. In this case, for example, in a case where a distance between the transceiver 100 and each of the transmission/reception connector 40 and the first intermediate connector 50 is small, it is possible to increase the degree of freedom of work when the first transmitting optical fiber 21, the second transmitting optical fiber 61, the first receiving optical fiber 22, and the second receiving optical fiber 62 connected between each port of the first intermediate connector 50 and each port of the transceiver 100 are connected to another port of the first intermediate connector 50 or another port of the transceiver 100. Further, the transmission/reception connector 40 may be positioned outside the housing 2. Further, the transmission/reception connector 40 may be positioned outside the housing 2, and the fusion-spliced portion may be positioned inside the housing 2 or outside the housing 2. Furthermore, the number of transmission/reception connectors 40 may be plural. In addition, the first transmitting optical fiber 21 and the second transmitting optical fiber 61 may be connected to each other by an optical fiber holding member such as a mechanical splice element instead of the transmission/reception connector 40, or the first receiving optical fiber 22 and the second receiving optical fiber 62 may be connected to each other.

In the above embodiments, the outer diameter of the cladding of each of the second transmitting optical fiber 61 and the second receiving optical fiber 62 is larger than the outer diameter of the cladding of each of the first transmitting optical fiber 21 and the first receiving optical fiber 22, and the optical confinement power of each of the first transmitting optical fiber 21 and the first receiving optical fiber 22 is greater than the optical confinement power of each of the second transmitting optical fiber 61 and the second receiving optical fiber 62, but this is not essential. Alternatively, in at least one of an optical fiber pair including the first transmitting optical fiber 21 and the second transmitting optical fiber 61 optically coupled to each other and an optical fiber pair including the first receiving optical fiber 22 and the second receiving optical fiber 62 connected to each other, the outer diameter of the cladding of the second transmitting optical fiber 61 or the second receiving optical fiber 62 may be larger than the outer diameter of the cladding of the first transmitting optical fiber 21 or the first receiving optical fiber 22, and the optical confinement power of each of the first transmitting optical fiber 21 and the first receiving optical fiber 22 may be greater than the optical confinement power of each of the second transmitting optical fiber 61 and the second receiving optical fiber 62. That is, in at least one of a plurality of single-core fiber pairs including a plurality of first single-core fibers including each of the first transmitting optical fibers 21 and each of the first receiving optical fibers 22 and a plurality of second single-core fibers including each of the second transmitting optical fibers 61 and each of the second receiving optical fibers 62 and optically coupled to the respective first single-core fibers, the optical confinement power of the first single-core fiber may be greater than the optical confinement power of the second single-core fiber, and the outer diameter of the cladding of the second single-core fiber may be larger than the outer diameter of the cladding of the first single-core fiber. Similarly, in at least one of such a plurality of single-core fiber pairs, the first single-core fiber may include the trench layer, the second single-core fiber does not have to include the trench layer, and the outer diameter of the cladding of the second single-core fiber may be larger than the outer diameter of the cladding of the first single-core fiber.

In the above embodiments, an example in which a part of each multicore fiber 10, the fan-in/fan-out device 30, each first transmitting optical fiber 21, and each first receiving optical fiber 22 are accommodated in the space of the housing 2 has been described, but the housing 2 is not an essential component.

In addition, the transmission/reception connector 40 is not limited to the above form, and may include, for example, single-core transmission connectors whose number is equal to the number of first transmitting optical fibers 21 having one transmission connector port 41 and single-core reception connectors whose number is equal to the number of first receiving optical fibers 22 having one reception connector port 42. In addition, for example, if the number of first transmitting optical fibers 21 is the same as the number of first receiving optical fibers 22, the transmission/reception connector 40 may include one transmission connector port 41 and one reception connector port 42, and may include dual transmission/reception connectors whose number is equal to the number of first transmitting optical fibers 21.

In addition, as another example of the multicore fiber 10, a plurality of single-core fibers in which a core is surrounded by a cladding can be gathered by a resin.

In addition, at least some of the optical fibers that are the first transmitting optical fiber 21 and the first receiving optical fiber 22 may include a plurality of optical fiber connecting bodies. One optical fiber may have a limited fiber length. Therefore, as the first transmitting optical fiber 21 and the first receiving optical fiber 22 include the optical fiber connecting bodies, the first transmitting optical fiber 21 and the first receiving optical fiber 22 can be elongated. In this case, the plurality of optical fibers may be connected by fusion splicing. A connection loss can be reduced by fusion splicing as compared with a case where a plurality of optical fibers are connected by a connector. In addition, at least some of the optical fibers that are the second transmitting optical fiber 61 and the second receiving optical fiber 62 may include a plurality of optical fiber connecting bodies. Also in this case, the second transmitting optical fiber 61 and the second receiving optical fiber 62 can be elongated. Also in this case, from the viewpoint of reducing the connection loss, the plurality of optical fibers may be connected by fusion splicing.

In one or more embodiments, the first transmitting optical fiber 21 and the first receiving optical fiber 22 may be bundled together by a single sheath or a plurality of sheaths as a ribbon, and the second transmitting optical fiber 61 and the second receiving optical fiber 62 may be bundled together by a single sheath or a plurality of sheaths as a ribbon. As a result, the arrangement of the first transmitting optical fiber 21 and the first receiving optical fiber 22 and the arrangement of the second transmitting optical fiber 61 and the second receiving optical fiber 62 can be fixed. Therefore, a positional relationship between the ends of the respective optical fibers becomes clear, and connection between the first transmitting optical fiber 21 and the second transmitting optical fiber 61 and connection between the first receiving optical fiber 22 and the second receiving optical fiber 62 can be facilitated. In addition, in this case, in a case where the transmission/reception connector 40 is not provided and the first transmitting optical fiber 21 and the second transmitting optical fiber 61 are fusion-spliced to each other or the first receiving optical fiber 22 and the second receiving optical fiber 62 are fusion-spliced to each other, since the positional relationship between the optical fibers is clear, fusion splicing is easily performed. In addition, in a case where the first transmitting optical fiber 21, the first receiving optical fiber 22, the second transmitting optical fiber 61, and the second receiving optical fiber 62 include the optical fiber connecting bodies in which a plurality of optical fibers are fusion-spliced to each other, the optical fibers fusion-spliced to each other may be included in separate ribbons. In this case, since the positional relationship between the plurality of optical fibers included in the separate ribbons is clear, in a case where the ribbons are connected to each other, it is easy to form the optical fiber connecting body by fusion splicing the plurality of optical fibers to each other.

According to one or more embodiments of the present invention, it is possible to provide an optical input/output device capable of reducing crosstalk that affects communication, and the optical input/output device can be used, for example, in the field of optical communication and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical input/output device comprising:
   one or more multicore fibers each comprising one or more transmitting cores and one or more receiving cores;
   first transmitting single-core fibers whose number is equal to a total number of the transmitting cores in all the multicore fibers;
   first receiving single-core fibers whose number is equal to a total number of the receiving cores in all the multicore fibers;
   a fan-in/fan-out device that optically couples each core of the first transmitting single-core fibers and each of the transmitting cores at one end of a respective one of the first transmitting single-core fibers, and optically couples each of the first receiving single-core fibers and each of the receiving cores at one end of a respective one of the first receiving single-core fibers; and
   a transmission/reception connector comprising connector ports whose number is equal to a total number of the first transmitting single-core fibers and the first receiving single-core fibers, wherein
      the connector ports are connected to an other end of the respective first transmitting single-core fibers and configured to optically couple cores of the respective first transmitting single-core fibers and transmission ports of a transceiver, and
      the connector ports are connected to an other end of the respective first receiving single-core fibers and configured to optically couple cores of the respective first receiving single-core fibers and reception ports of the transceiver.

2. The optical input/output device according to claim 1, wherein one or more core pairs adjacent to each other at a shortest distance in one or more of the multicore fibers is a transmitting/receiving core pair including one of the transmitting cores and one of the receiving cores.

3. The optical input/output device according to claim 2, wherein in one or more of the multicore fibers, all the core pairs adjacent to each other at a shortest distance are the transmitting/receiving core pairs.

4. The optical input/output device according to claim 1, wherein
   the optical input/output device comprises two or more of the multicore fibers,
   the cores of the respective first transmitting single-core fibers connected to a pair of connector ports adjacent to each other are optically coupled to the transmitting cores of different multicore fibers, respectively, and
   the cores of the respective first receiving single-core fibers connected to a pair of connector ports adjacent to each other are optically coupled to the receiving cores of different multicore fibers, respectively.

5. The optical input/output device according to claim 1, wherein
the cores of the respective first transmitting single-core fibers connected to a pair of connector ports adjacent to each other are optically coupled to a pair of the transmitting cores, respectively, other than the core pair adjacent to each other at a shortest distance in one multicore fiber, and
the cores of the respective first receiving single-core fibers connected to a pair of connector ports adjacent to each other are optically coupled to a pair of the receiving cores, respectively, other than the core pair adjacent to each other at a shortest distance in one multicore fiber.

6. The optical input/output device according to claim 5, wherein
one or more of the receiving cores are positioned between two of the transmitting cores of the multicore fibers to which the cores of the respective first transmitting single-core fibers connected to the pair of connector ports adjacent to each other are optically coupled, and
one or more of the transmitting cores are positioned between two of the receiving cores of the multicore fibers to which the cores of the respective first receiving single-core fibers connected to the pair of connector ports adjacent to each other are optically coupled.

7. The optical input/output device according to claim 1, wherein
optical input/output device comprises two or more of the multicore fibers, in which a central core disposed at a center of a cladding is one of the transmitting cores or one of the receiving cores, and one or more of the transmitting cores and one or more of the receiving cores are disposed around the central core,
the transmission/reception connector comprises a plurality of partial connectors including two or more connector ports among all the connector ports,
each of the first transmitting single-core fibers or first receiving single-core fibers optically coupled to the central core of each of the multicore fibers is connected to the connector port of a specific one of the partial connectors, and
each of the first transmitting single-core fibers, which is connected to each of the transmitting cores disposed around the central core of each of the multicore fibers, and each of the first receiving single-core fibers, which is connected to each of the receiving cores disposed around the central core of each of the multicore fibers, are connected to the connector ports of one of the partial connectors other than the specific partial connector.

8. The optical input/output device according to claim 1, wherein all the multicore fibers are longer than each of the first transmitting single-core fibers and each of the first receiving single-core fibers.

9. The optical input/output device according to claim 1, further comprising:
a housing that accommodates at least a part of each of the first transmitting single-core fibers and each of the first receiving single-core fibers;
second transmitting single-core fibers whose number is equal to the total number of the first transmitting single-core fibers, wherein each core of the second transmitting single-core fibers is configured to be optically coupled to each core of the first transmitting single-core fibers at the other end of the respective first transmitting single-core fibers and be optically coupled to the transmission ports of the transceiver, and the second transmitting single-core fibers are at least partially disposed outside the housing; and
second receiving single-core fibers whose number is equal to the total number of the first receiving single-core fibers, wherein
each core of the second receiving single-core fibers is configured to be optically coupled to each core of the first receiving single-core fibers at the other end of the respective first receiving single-core fibers and be optically coupled to the reception ports of the transceiver, and the second receiving single-core fibers are at least partially disposed outside the housing,
a plurality of single-core fiber pairs including a plurality of first single-core fibers, which include each of the first transmitting single-core fibers and each of the first receiving single-core fibers, and a plurality of second single-core fibers, which include each of the second transmitting single-core fibers and each of the second receiving single-core fibers and are optically coupled to the respective first single-core fibers, and
in one or more of the plurality of single-core fiber pairs, an optical confinement power of each of the first single-core fibers is greater than an optical confinement force of respective second single-core fibers, and an outer diameter of a cladding of each of the second single-core fibers is larger than an outer diameter of a cladding of respective first single-core fibers.

10. The optical input/output device according to claim 1, further comprising:
a housing that accommodates at least a part of each of the first transmitting single-core fibers and each of the first receiving single-core fibers;
second transmitting single-core fibers whose number is equal to the total number of first transmitting single-core fibers, wherein each core of the second transmitting single-core fibers is configured to be optically coupled to each core of the first transmitting single-core fibers at the other end of the respective first transmitting single-core fibers and be optically coupled to the transmission ports of the transceiver, and the second transmitting single-core fibers are at least partially disposed outside the housing; and
second receiving single-core fibers whose number is equal to the total number of the first receiving single-core fibers, wherein
each core of the second receiving single-core fibers is configured to be optically coupled to each core of the first receiving single-core fibers at the other end of the respective first receiving single-core fibers and be optically coupled to the reception ports of the transceiver, and the second receiving single-core fibers are at least partially disposed outside the housing,
a plurality of single-core fiber pairs includes a plurality of first single-core fibers, which include each of the first transmitting single-core fibers and each of the first receiving single-core fibers, and a plurality of second single-core fibers, which include each of the second transmitting single-core fibers and each of the second receiving single-core fibers and are optically coupled to the respective first single-core fibers,
each of the first single-core fibers includes a first core, a first cladding, and a first trench layer that is surrounding the first core and surrounded by the first cladding, the first trench layer having a lower refractive index than that of the first cladding, which has a lower refractive index than that of the first core, each of the second single-core fibers includes a second core, a second cladding, and a second trench layer that is surrounding the second core and surrounded by the second cladding, the second trench layer having a lower refractive index than that of the second cladding, which has a lower refractive index than that of the second core, and in one or more of the plurality of single-core fiber pairs, an outer diameter of the second cladding of each of the second single-core fibers is larger than an outer diameter of the first cladding of each of the first single-core fibers.

11. The optical input/output device according to claim 1, wherein each core of the first transmitting single-core fibers and the transmission ports of the transceiver are optically coupled, and each core of the first receiving single-core fibers and the reception ports of the transceiver are optically coupled.

* * * * *